United States Patent [19]
Evans

[11] 3,722,464
[45] Mar. 27, 1973

[54] APPARATUS FOR COATING AND SEPARATING PELLETS

[75] Inventor: David Evans, Swansea, Wales

[73] Assignee: The International Nickel Company, Inc., New York, N.Y.

[22] Filed: June 24, 1971

[21] Appl. No.: 156,288

[52] U.S. Cl.................118/48, 23/288 G, 118/303, 209/246, 209/254
[51] Int. Cl..............................................C23c 13/08
[58] Field of Search..................118/48–49.5, 303; 117/1 NQ, 100, 106–107.2; 23/288 G; 209/254, 246

[56] References Cited

UNITED STATES PATENTS

| | | | |
|---|---|---|---|
| 1,037,221 | 9/1912 | Dull | 209/254 |
| 2,384,932 | 9/1945 | Lechthaler | 23/288 G X |
| 2,647,044 | 7/1953 | Savage et al. | 23/288 G |
| 2,684,124 | 7/1954 | Hines, Jr. | 23/288 G X |
| 3,155,542 | 11/1964 | Cordell et al. | 118/303 |

FOREIGN PATENTS OR APPLICATIONS

| | | | |
|---|---|---|---|
| 620,287 | 3/1949 | Great Britain | 118/48 |

Primary Examiner—Morris Kaplan
Attorney—Maurice L. Pinel

[57] ABSTRACT

Fully grown nickel pellets are separated from the circulating load in a pellet carbonyl decomposer by discharging the load on to a conical pile of pellets formed between a horizontal circular dam and a circular feed nozzle, a flexible curtain being mounted with its lower edge touching the surface of the pile. The fully grown pellets roll preferentially down the pile and overflow the dam with some undersize pellets, which are separated by screening and returned to circulation.

1 Claim, 1 Drawing Figure

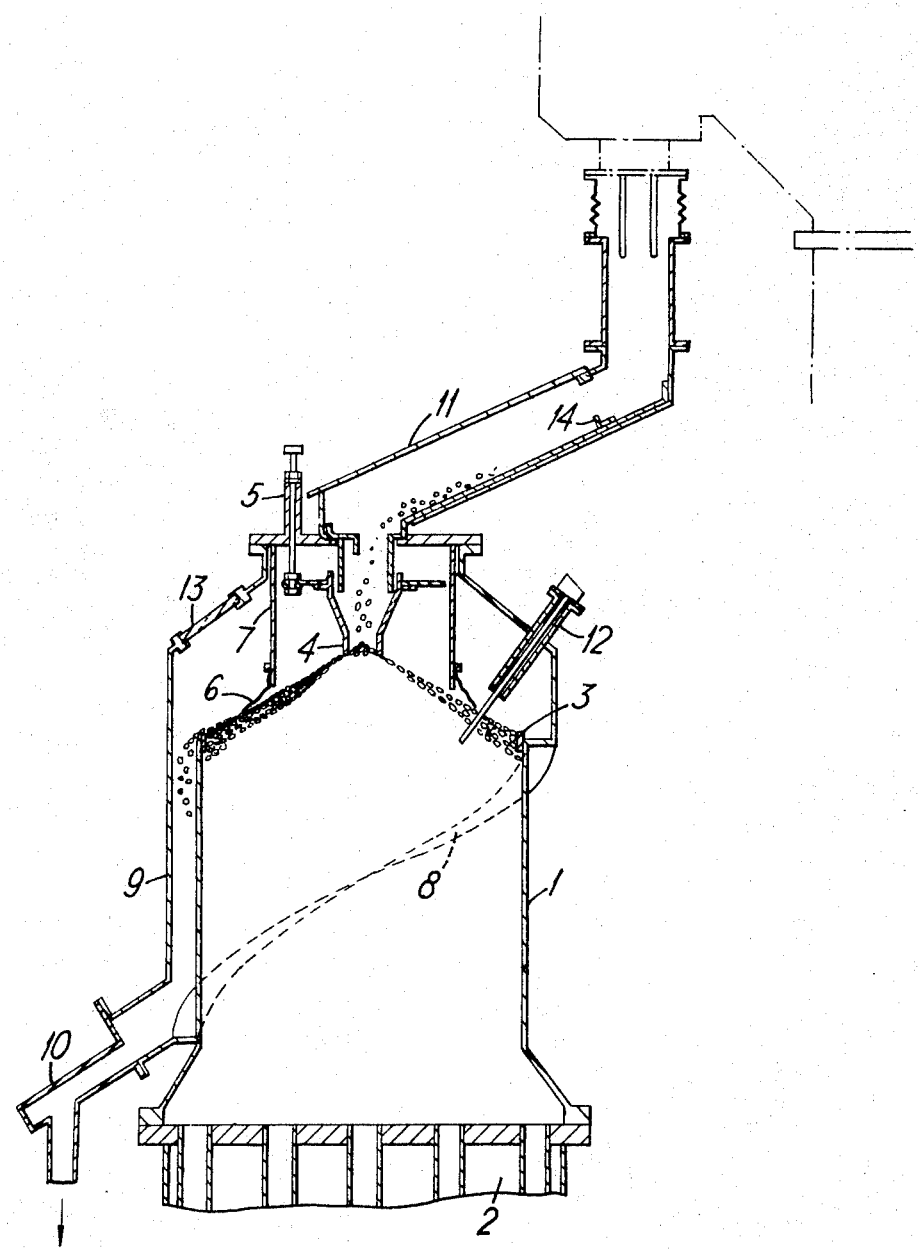

APPARATUS FOR COATING AND SEPARATING PELLETS

The present invention relates to pellet size classification and apparatus therefor, and more particularly to apparatus for classifying carbonyl metallic pellets in a carbonyl decomposer.

In the Mond process for producing nickel through the formation and subsequent decomposition of nickel carbonyl, as described in British Pat. No. 620,287, a gas containing nickel carbonyl is brought into contact in a decomposer with nickel pellets that have been preheated to a temperature above the decomposition temperature of the carbonyl. The nickel is deposited on the pellets as the pellets pass downwards through the reaction chamber of the decomposer in counter-current to a stream of carbonyl-containing gas, and the pellets leaving the bottom of the reaction chamber are recirculated through the preheater and then back through the reaction chamber.

Deposition of nickel on the pellets causes them to increase in size, and at any time the circulating charge includes pellets of all sizes ranging from minute seed particles to fully grown pellets of the required product size, say ⅜ inch diameter.

In order to separate the pellets that have reached or exceeded a predetermined size, which will be referred to as oversize pellets, the circulating pellets are allowed to fall on to the top of a conical pile of pellets at the top of the preheater. Oversize pellets tend to roll down the surface of this cone and thence down a chute and over a screen to a product vessel, while the remaining smaller pellets, forming the bulk of the feed, lodge preferentially on the surface of the pile. While the pile is being built up in this way at the top, pellets from the bottom pass downwards into the preheater, so that the height of the pile remains substantially constant and its surface remains in substantially the same position. Any undersize pellets that have been carried over with the oversize pellets pass through the screen and are put back into circulation.

It has now been discovered that the aforedescribed apparatus for classifying carbonyl metallic pellets can be improved to provide a cleaner separation between undersized and oversized pellets.

Another object of the invention is to provide improved apparatus for classifying pellets.

Other objects and advantages will become apparent from the following description taken in conjunction with the accompanying FIGURE in which a preferred embodiment of the pellet classifier in accordance with the present invention is shown in sectional elevation.

Generally speaking, the present invention contemplates an apparatus for classifying pellets. A reservoir having a continuous periphery is filled with pellets so that the pellets form a pile having a conical surface, apex upwards. A mixture of pellets having oversized and undersized pellets is fed to the conical surface in the vicinity of the apex so that the mixture of pellets can flow over the conical surface. Pellets are removed from the bottom of the reservoir in a uniform manner so as not to disturb the conical surface and at a rate to maintain the pile at a substantially constant height. The rate of flow of the mixture of pellets over the surface is controlled so that the oversized pellets retain sufficient energy to flow over the entire conical surface and over the reservoir periphery while the undersized pellets become entrapped in interstices of the conical surface.

Advantageously, a conical pile of pellets is formed between a horizontal circular dam and a vertically adjustable circular feed nozzle mounted centrally above the dam, and a flexible curtain is mounted with its lower edge touching the surface of the cone between the feed nozzle and the dam. To ensure that the pellets overflow the dam uniformly, it is important that the top of the dam is accurately horizontal, and advantageously it is also adjustable for this purpose. The outside edge of the dam should preferably be chamfered.

Advantageously the dam forms the upper rim of a cylindrical pellet reservoir from which the pellets pass into the preheater, and the pellets overflowing the dam fall on to one or more helical chutes around the outside of the reservoir leading to an outlet pipe or pipes to the screen and product vessel.

Referring now to the FIGURE, a cylindrical pellet reservoir 1 is mounted on top of a pellet preheater 2, of which only the top is shown, which in turn is mounted on top of the reaction chamber of a carbonyl decomposer. The reservoir carries around its upper edge a circular dam 3 which can be adjusted so as to be accurately horizontal. Centrally above the dam is mounted a discharge nozzle 4, the height of which can be varied by means of three adjusting screws 5 (only one being shown) and a flexible circular curtain 6 is mounted on the bottom of a cylindrical holder 7 surrounding the nozzle 4. Around the outside of the reservoir 1, between the reservoir and an outer casing 9, are twin chutes in the form of helices 8 of opposite hand leading down from the level of the dam to an outlet pipe 10 leading to a screen (not shown). In order to avoid blockages the inclination of these helices should be at least 30° to the horizontal so that pellets can slide as well as roll down them.

Nickel pellets passing downwards from the reservoir 1 through the preheater 2 and the reaction chamber are then collected and raised by an elevator (not shown) to the top of a chute 11 from which they pass through the nozzle on to a conical pile of pellets that builds up between the nozzle 4 and the dam 3.

The pile builds up at the natural angle of repose of the pellets, and it is important to adjust the height of the nozzle 4 so that pellets may flow freely from it on to the pile. If the nozzle is too low, the pile will build up around it and the flow of pellets will be impeded and may soon be stopped. If the nozzle is too high, the pellets fall with excessive force on to the pile and cause excessive disturbance of the pile, resulting in the larger pellets becoming embedded in the surface instead of rolling freely down the pile, and undersize pellets being forced past the curtain and rolling on to overflow the dam.

Ideally the nozzle is just clear of the surface of the pile. Most of the pellets leaving the nozzle then begin to roll down the outside of the pile, but small pellets lodge in the interstices or indentations in the surface while larger ones roll over the indentations to reach the dam, where they overflow and fall on to one of the helices and thence pass to the outlet pipe 9.

The nozzle 4 should also be accurately centered above the dam and have its lower edge horizontal, so that the pellets issuing from it are distributed uniformly around the pile.

Further measures which help to reduce the energy of the pellets reaching the pile are to incline the chute 11 to the horizontal at the smallest angle consistent with maintaining a steady flow of pellets, and to provide one or more baffles 14 in the feed pipe or the upper part of the nozzle, or both.

The curtain 6 in contact with the surface of the pile allows pellets to roll past and down the surface of the pile but intercepts any pellets that may bounce off the upper part despite all these precautions. In passing the curtain the pellets are slowed down, thus improving the chances of their lodging in a suitable indentation and thereby making segregation more efficient. The material of the curtain should of course be sufficiently flexible to allow pellets to roll past, and it must resist relatively high temperatures, since the temperature of the pellets in the pile is about 180°C. A suitable material is polyester fiber cloth. Advantageously at least the lower part of the curtain is divided vertically into strips, and it is also advantageous to construct the curtain in two layers each of which is divided in this way so that the strips in the two layers overlap.

To monitor the temperature of the pellets a thermocouple 12 is mounted in the top of the casing, which is also provided with a sight-glass 13 through which the surface of the pile can be observed.

The height of the reservoir 1 may if desired be reduced by using two or more pairs of helical chutes in place of the single pair in the example, with a correspondingly increased number of outlet pipes.

It will be appreciated that in a single passage of the whole charge of pellets circulating through the decomposer only a proportion of the oversize pellets will be separated, while the remainder become incorporated in the pile and are recirculated. Furthermore, although the oversize pellets that preferentially overlow the dam are inevitably accompanied by a small number of undersize pellets, these can readily be separated from the oversize pellets by screening and returning them to circulation, whereas it would be completely impractical to carry out the separation by continuously screening the whole circulating load of pellets.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. In a pellet decomposer for thermally decomposing metal compounds that are heat decomposable to metal including a preheater for preheating pellets to a temperature sufficiently high to decompose the metal compound, a reactor in which the metal compound is thermally decomposed on the preheated pellets and recirculating means for recirculating cooled pellets from the reactor to the preheater, the improvement which comprises pellet classifying means which includes: an open-topped reservoir having a continuous periphery; a plurality of outlet means in the bottom of the reservoir for continually removing pellets therefrom; feeding means for feeding a mixture of oversized and undersized pellets to the center of the reservoir for filling the reservoir and for forming a pellet pile having a conical surface, apex upwards, so that pellets fed to the pile flow downwardly over the conical surface with oversized pellets flowing over the periphery of the reservoir while the undersized pellets become lodged in interstices of the conical surface; and energy-absorbing means between the periphery of the reservoir and the feeding means for slowing the flow of pellets down the conical surface to increase the chance of lodging all but the oversized pellets in interstices on the pile surface.

* * * * *